(12) United States Patent
Haginoya et al.

(10) Patent No.: US 7,505,232 B2
(45) Date of Patent: Mar. 17, 2009

(54) MAGNETIC HEAD WITH SIDE SHIELD AND MANUFACTURING METHOD THEREOF

(75) Inventors: Chiseki Haginoya, Tokyo (JP); Masahiko Hatatani, Kanagawa (JP); Chiaki Ishakawa, Tokyo (JP); Kenichi Meguro, Kanagawa (JP); Kazuhiro Nakamoto, Kanagawa (JP); Katsuro Watanabe, Ibaragi (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 393 days.

(21) Appl. No.: 11/166,338

(22) Filed: Jun. 24, 2005

(65) Prior Publication Data

US 2006/0018055 A1 Jan. 26, 2006

(30) Foreign Application Priority Data

Jun. 24, 2004 (JP) .............................. 2004-186832

(51) Int. Cl.
G11B 5/39 (2006.01)
(52) U.S. Cl. .................... 360/319; 360/324.12
(58) Field of Classification Search ................. 360/319, 360/324.12
See application file for complete search history.

(56) References Cited

U.S. PATENT DOCUMENTS

| | | | | |
|---|---|---|---|---|
| 5,959,813 A | * | 9/1999 | Watanabe et al. | 360/126 |
| 6,466,419 B1 | * | 10/2002 | Mao | 360/324.12 |
| 6,556,392 B1 | * | 4/2003 | Mao et al. | 360/324.12 |
| 6,680,829 B2 | * | 1/2004 | Chen et al. | 360/319 |
| 6,680,832 B2 | | 1/2004 | Fontana, Jr. et al. | |
| 6,700,760 B1 | * | 3/2004 | Mao | 360/324.2 |
| 6,807,032 B1 | * | 10/2004 | Seigler et al. | 360/319 |
| 6,967,823 B2 | * | 11/2005 | Nakamoto et al. | 360/319 |
| 6,980,403 B2 | * | 12/2005 | Hasegawa | 360/319 |
| 7,158,351 B2 | * | 1/2007 | Nakamoto et al. | 360/319 |
| 7,280,325 B1 | * | 10/2007 | Pan | 360/324.12 |
| 2004/0100737 A1 | * | 5/2004 | Nakamoto et al. | 360/319 |
| 2004/0156148 A1 | * | 8/2004 | Chang et al. | 360/319 |
| 2005/0157431 A1 | * | 7/2005 | Hatatani et al. | 360/319 |

FOREIGN PATENT DOCUMENTS

| | | | | |
|---|---|---|---|---|
| JP | 60147915 A | * | 8/1985 | |
| JP | 07044826 A | * | 2/1995 | |
| JP | 2003-264324 A | | 9/2003 | |

* cited by examiner

Primary Examiner—William J Klimowicz
(74) Attorney, Agent, or Firm—Townsend and Townsend and Crew LLP; John Henkhaus

(57) ABSTRACT

In a side shield structure employed to narrow the effective track, a noise caused by the side shield structure can be reduced. In one embodiment, the side shield is inclined with respect to the film plane to suppress the generation of a magnetic pole in the end portion of the side shield. To this end, the side face of a device is inclined at a desired angle. Further, a reproduction device is formed at two or more angles $\beta_1$ and $\beta_2$ to improve the track width accuracy.

14 Claims, 4 Drawing Sheets

MAGNETIC HEAD WITH SIDE SHIELD AND MANUFACTURING METHOD THEREOF

CROSS-REFERENCES TO RELATED APPLICATIONS

This application claims priority from Japanese Patent Application No. JP2004-186832, filed Jun. 24, 2004, the entire disclosure of which is incorporated herein by reference.

BACKGROUND OF THE INVENTION

The present invention relates to a magnetic head and its manufacturing method and, particularly, to a magnetic head comprising a magneto resistance effect device as a reproduction device and its manufacturing method.

A magnetic recording and reproduction device records information by the magnetization direction of a medium and reproduces the information as voltage. This device comprises a medium for storing magnetization information, a recording head for generating a magnetic field to record information, a reproduction head for reading information on the magnetization of the medium, a mechanism for driving these heads and the medium, a recording and reproduction operation control circuit for controlling these, etc. The magnetic head is designed to float above the medium at a fixed height during its operation. A so-called "spin valve structure" which has two or more magnetic layers and obtains an output voltage from the relative angle of magnetization between them is widely used for the reproduction head.

Along with an increase in the density of a magnetic recording device, the minimum unit for recording information, that is, the size of recording bits is becoming smaller and smaller. To reduce the number of recording bits, the bit length and the track width must be reduced. To reproduce information from fine recording bits at the time of reading information, it is desired that a magnetic flux from the bits of interest should be detected with the reproduction head at high sensitivity whereas a magnetic flux from other portion which is the cause of a noise should not be detected as much as possible. Therefore, an upper shield and a lower shield composed of a soft magnet, e.g., Ni—Fe alloy in most cases are formed above and below the reproduction head in the bit length direction. The upper shield and the lower shield absorb a magnetic flux from an unnecessary area to contribute to the reduction of the influence of a sensor portion with respect to the bit length direction of a recording bit to be reproduced. It is thus known that the shields composed of a soft magnet have an effect in the bit length direction.

In recent years, a CPP (Current Perpendicular to the Plane) system in which a sense current is applied perpendicular to the film plane has been attracting much attention. According to this system, compared with the conventional CIP (Current In the Plane system that a sense current is applied in the plane direction), an insulating layer does not need to be formed between the upper shield and the lower shield, thereby making it possible to reduce the distance between the upper shield and the lower shield. Accordingly, it is considered that the CPP system can improve resolution in the bit length direction.

In the so-called "spin valve type" reproduction head, a magnetic field (so called "longitudinal bias") must be applied in the track width direction in order to suppress a noise caused by a free layer. There has been generally employed a so-called "hard bias system" that a longitudinal bias magnetic field is generated by a ferromagnet arranged on right and left sides of a sensor. Since the magnet used for the hard bias desirably generates a magnetic field in the same direction without being disturbed by an external magnetic field, a hard magnet is used. Meanwhile, the shields are desired to have soft magnetic properties. Since the hard bias and the shields differ from each other in required magnetic properties, when a hard bias system is used in combination, it is difficult to arrange a soft magnet on the right and left sides of the sensor and a magnetic shield effect cannot be obtained in the track width direction. Therefore, a phenomenon (so called "side reading") where information is read from the adjacent or nearby track occurs in the reproduction track width direction.

As means of providing a longitudinal bias magnetic field to the free layer, there has been proposed a system making use of magnetic interaction from the longitudinal bias layer formed above or below the sensor and not the ferromagnet arranged on the right and left sides of the sensor. For example, Journal of Applied Physics, vol. 93, No. 10, pp. 7310-7312 shows that a structure consisting of a soft magnet and an anti-ferromagnet is used as a longitudinal bias layer. Besides the structure consisting of a soft magnet and an anti-ferromagnet, a system using an anti-ferromagnet is also shown in Journal of Applied Physics, vol. 89, No. 11, pp. 7359-7631.

When this biasing system is used, it is not necessary to arrange a ferromagnet on the right and left sides of the sensor and accordingly, it is possible to arrange a soft magnet on the right and left sides of the sensor in place of the ferromagnet. For example, JP-A 2003-264324 (the term "JP-A" as used herein means an "unexamined published Japanese patent application") shows the effect of reducing the effective track width by arranging a soft magnet on the right and left sides of a sensor (so-called "side shield effect"). However, these documents do not mention the shape of the soft magnet (side shield) arranged on the right and left sides of the sensor and the shape of the sensor itself.

The side shield must efficiently absorb a magnetic flux other than a signal of interest generated from the adjacent track on the medium and so on. At the same time, a magnetic flux must not leak to the sensor side from the side shield. However, as will be described hereinafter, according to computer simulation conducted by the inventors of the present invention, it was found that a magnetic pole is generated on a side next to the sensor of the side shield according to the shape of the side shield. As this magnetic pole changes by the movement of magnetization in the side shield, it can be the cause of a noise to a reproduction signal. Even when the generated magnetic pole does not change, it is possible that magnetization rotation in the free layer may be prevented.

JP-A 264324/2003 discloses a diagram showing that the angle formed by the film plane of the sensor and the side shield is about 65° as an embodiment of that invention. It is further illustrated that the angle formed by the side face of the sensor itself and the film plane of the sensor is also about 65°. That is, in that invention, the plane of the side shield and the side face of the sensor are parallel to each other and it is not taken into consideration to control the shape of an insulator sandwiched between them. Similarly, U.S. Pat. No. 6,680,832 discloses an example in which the angle formed by the film plane of a sensor and the side shield is 90° but does not mention the control of its shape. U.S. Pat. No. 6,680,829 discloses a structure that a soft magnet is arranged on the right and left sides of a sensor but both ends of the sensor are composed of a conductor and the sensor has a CIP structure. That invention is characterized in that a soft magnet arranged as a side shield also serves as an electrode and that the side shield is insulated from the upper shield and the lower shield.

It is not mentioned in that invention that characteristic properties are improved by changing the shape of the side shield.

BRIEF SUMMARY OF THE INVENTION

Although the side shield has the effect of narrowing the effective track width, it increases a noise and reduces sensitivity.

It is a feature of the present invention to provide a magnetic head which can effectively narrow the reproduction track width by means of a side shield and reduce a noise caused by the side shield.

It was discovered that the effective track width can be narrowed while the above-mentioned problems are eliminated by optimizing the shape of the side shield. The optimized side shield has a shape such that the angle a formed by the interface between an insulator adjacent to the side shield and the side shield and the film plane of a reproduction device changes to two or more values when seen from the film thickness direction of the reproduction device.

The side shield having the above shape can be manufactured by milling the reproduction device using an ion beam in two stages with a resist pattern as a mask by changing the incident direction of the ion beam, forming an insulating layer, lifting off the resist and forming a soft magnet for the side shield on the insulating layer. Two-stage milling is carried out with an ion beam whose incident direction is substantially aligned with the film plane normal direction until the milling of the free layer is over and then with an ion beam whose incident direction is inclined with respect to the film plane normal direction.

According to the present invention, the reproduction track width can be effectively narrowed by the side shield, a noise caused by the side shield is suppressed, and the geometrical track width can be constituted with high accuracy.

DETAILED DESCRIPTION OF THE INVENTION

Specific embodiments of the present invention will be described hereinunder with reference to the accompanying drawings.

Figure 1:
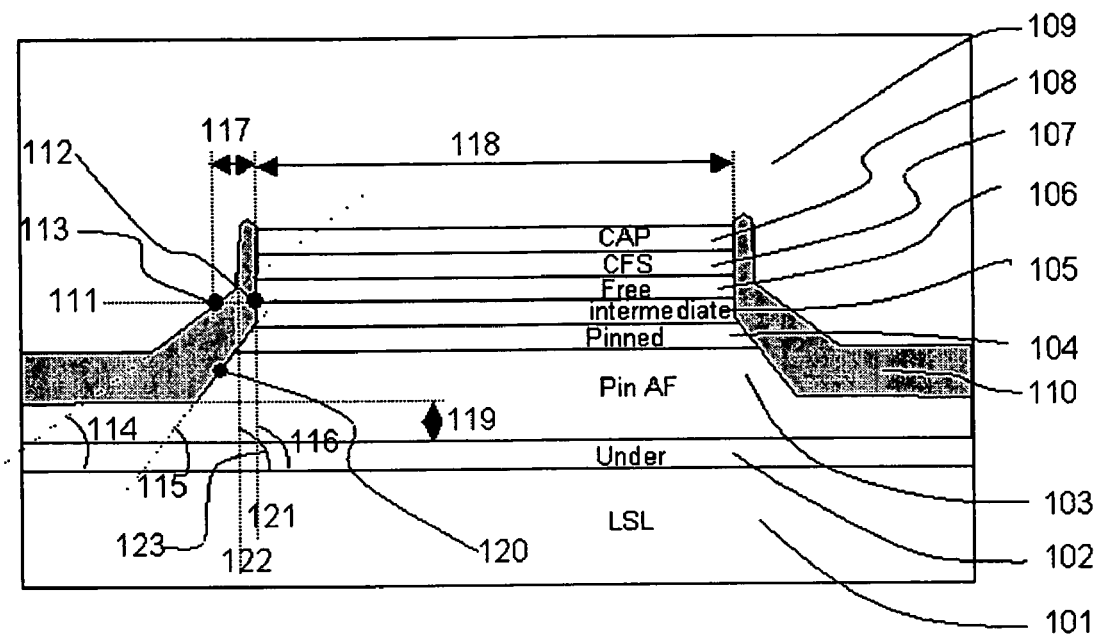
FIG. 1 is a diagram showing a side shield structure according to an embodiment of the present invention.

FIG. 1 is a schematic diagram of the air bearing surface of a reproduction head showing the characteristic feature according to an embodiment of the present invention. Sensor layers including an under layer 102 for improving crystallinity, pinning layer 103 made of an anti-ferromagnet, pinned layer 104, intermediate layer 105, free layer 106 made of a soft magnet, longitudinal bias layer 107 for stabilizing the magnetization direction in the free layer and cap layer 108 are formed on a lower shield 101 made of a soft magnet. The intermediate layer 105 is made of 0.9 nm Al—O in this embodiment but it may be made of an insulator such as Al—N or Si—O, a conductor such as Cu, or multi-layer film consisting of these layers. When an insulator is used as the intermediate layer 105, a TMR (Tunneling Magneto Resistive) head is obtained and when a conductor is used, CPP-GMR (CPP-Giant Magneto Resistive) head is obtained. The longitudinal bias layer 107 is a multi-layered film consisting of Ru, Cu, CoFe and MnPt layers in the order named in this embodiment. Another non-magnetic metal in place of Ru or Cu, another soft magnetic metal in place of CoFe, or another anti-ferromagnet in place of MnPt may be used as required. In place of this structure, a ferromagnet may be used as shown in Journal of Applied Physics, vol. 89, No. 11, pp. 7359-7631. The cap layer 108 is used to protect the sensor film during the production process and made of Ta in this embodiment.

In this embodiment, a CPP structure that a sensor current is applied in the vertical direction in the diagram is employed. Therefore, the lower shield 101 and the upper shield 109 also serve as electrodes for applying a current to the device in this embodiment. Therefore, the lower shield 101 and the upper shield 109 must be electrically insulated at a site other than the device portion. To this end, the lower shield 101 and the upper shield 109 are insulated by the insulator 110 at a site other than the device portion. In this embodiment, a multi-layered film consisting of $Al_2O_3$ and $Al_2O_3$—$SiO_2$ layers is used as the insulator 110 but another substance which can insulate the upper shield 109 from the lower shield 101 may be used. After the insulator 110 is formed on the right and left sides of the sensor, the upper shield 109 having electrode and shielding functions is formed. To achieve the above both purposes, the upper shield 109 is desirably a conductor having soft magnetic properties. For example, Permalloy is used in this embodiment.

Magnetization in the free layer 106 is rotated by a magnetic field from the medium in the reproduction head at the time of reproducing a signal. The magnetization direction of the pinned layer 104 is fixed by the pinning layer 103 to prevent free rotation. Therefore, the relative directions of magnetization of the pinned layer 104 and the free layer 106 are changed by the magnetic field from the medium. When use is made of the phenomenon that electric resistance is changed by the relative angular change of magnetization, an external magnetic field, that is, a magnetic field caused by the magnetization direction on the medium can be detected. This system is known as so-called "spin valve structure".

An external magnetic field caused by a track or bit other than the reproduction track or reproduction bit of interest becomes a noise at the time of reproducing a signal. To shield magnetization in the free layer 106 from an external magnetic field, a soft magnet is arranged around the free layer as a magnetic shield in the present embodiment. That is, the sectional shape of the sensor and the film thickness and growing conditions of the insulator 110 are determined so that a soft magnet which is part of the upper shield 109 is existent on an extension line 111 in the film plane direction of the free layer. The above structure that a soft magnet is arranged near the device on the extension line 111 in the film plane direction of the free layer 106 is called "side shield". This name is given because the sides of the free layer are shielded by the soft magnet. The side shield may be magnetically integrated with the upper shield 109 as shown in FIG. 1 or separated from the upper shield 109.

In the present embodiment, the angle formed by the interface between the insulator 110 and the upper shield 109 and the film plane of the sensor changes to two or more values. In this embodiment, the inclination $\alpha_2$ (114) of the interface between the insulator 110 and the upper shield 109 on the extension line in the plane direction of the intermediate layer is smaller than the inclination $\alpha_1$ (123) of the interface (extension line 122) above that interface. To manufacture such a structure, in this embodiment, the angle $\beta_1$ (116) formed by the extension line 121 of the end face of the free layer and the film plane direction is made different from the angle $\beta_2$ (115) formed by the tangent line of the end face of the pinning layer 103 and the film plane direction. As the side faces of the free layer 106 and the pinning layer 103 are not always linear but may be curved, the angles $\beta_1$ and $\beta_2$ are defined by the tangents of the side faces at the centers of the free layer 106 and the pinning layer 103, respectively. The process for forming this shape will be described hereinafter.

As shown in FIG. 1, when the angle $\beta_2$ is made smaller than the angle $\beta_1$ the free layer 106 has a side face with a right angle to the film plane direction near its end face. Compared with a case where the angle $\beta_1$ is small, the accuracy of the track width for forming the geometrical track width 118 by ion beam etching can be improved. In this embodiment, the angle $\beta_1$ is 85° and the angle $\beta_2$ is 45°.

The inner intersection point 112 between the extension line 111 and the insulator 110 and the outer intersection point 113 between the extension 111 and the insulator 110 are taken into consideration. The angle formed by the interface between the insulator 110 and the device portion at the point 112 and the film plane direction is represented by $\beta_1$ (116) and the angle formed by the interface between the insulator 110 and the soft magnet at the point 113 and the film plane direction is represented by $\alpha_2$ (114). When the interface between the insulator 110 and the soft magnet is curved, the angle formed by the tangent at the point 120 and the film plane direction may be represented by $\beta_2$ (115). The distance between the point 112 and the point 113 in the horizontal direction is denoted by 117.

Figure 2:
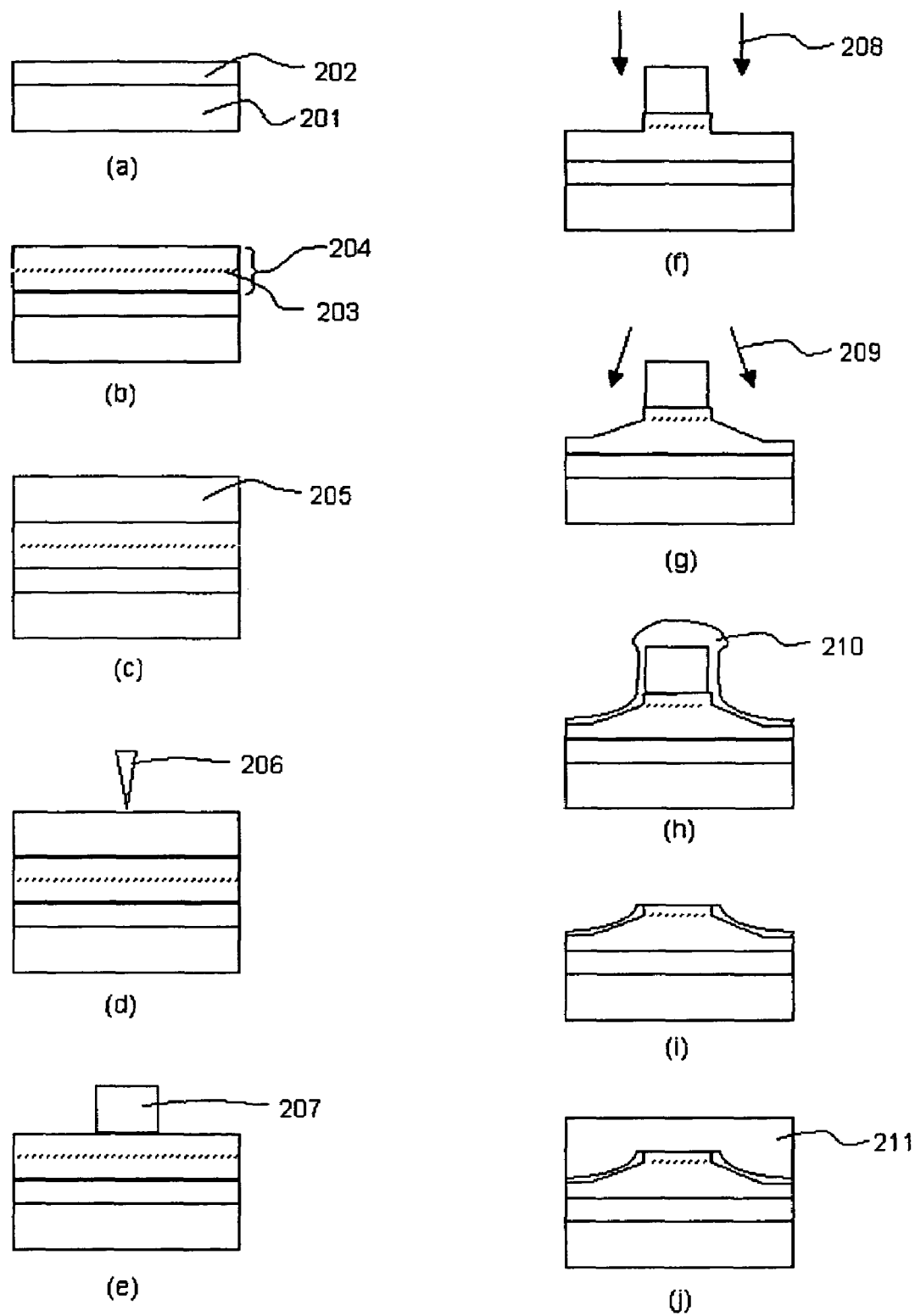
FIG. 2 is a diagram showing the production process of the side shield structure according to an embodiment of the present invention.

The process employed to manufacture the structure shown in FIG. 1 will be described with reference to FIG. 2. A lower shield 202 made of a soft magnet is grown on a substrate 201 (a). A sensor film 204 including an intermediate layer 203 is deposited on the lower shield 202 in a vacuum chamber by sputtering (b). The sensor film 204 is constituted the same as in FIG. 1. For example, in this embodiment, a TMR structure made of 0.8 nm alumina is used as the intermediate layer 203. A CPP-GMR structure made of a conductive material such as copper may be employed. In this embodiment, the sensor film 204 is constituted such that a longitudinal bias layer and a free layer are formed on the intermediate layer 203 and a pinned layer is formed under the intermediate layer 203. An electron beam resist 205 is applied to the sensor film 204 by rotational coating (c). The thickness of the resist 205 is 200 nm. An electron beam 206 which has been converged is applied to the resist 205 by an electron beam exposure machine to form a required track pattern (d). After exposure, development is carried out to obtain a resist pattern 207 corresponding to the drawn pattern (e). In this embodiment, an electron beam having an acceleration voltage of 70 kV is used and the size in the track width direction of the resist is 90 nm. The resist coating, exposure and development conditions are controlled to achieve a dimensional error of about ±10 nm or less.

The magnetic layer is milled by ion beam etching (IBE) with the resist pattern 207 as a mask. In this embodiment, Ar is used as a milling gas but another ion may be used. In this step, the ion beam 208 is applied at an angle $\theta_1$ with respect to the disk normal direction until the cap layer, longitudinal bias layer, free layer and intermediate layer are etched. $\theta_1$ is kept at 2° or less, whereby the top portion of the reproduction device can obtain an almost vertical cut section. During etching, the elemental analysis of secondary ions is carried out with a mass spectroscope to confirm that etching of up to the intermediate layer is finished (f). If it can be confirmed that the uniformity of the ion beam 208 and the sensitivity of mass spectroscopy are sufficiently high and the etching of the free layer is completed over the entire surface of the wafer, IBE may be terminated during the etching of the intermediate layer. The confirmation of the end of etching may be carried out by emission spectrometry in place of mass spectroscopy. The incident direction of the ion beam 209 is set to an angle $\theta_2$ with respect to the disk normal direction. Ion beam etching is suspended halfway through the pinning layer so that $\theta_2$ becomes 20° and the offset 119 becomes 15 nm (g). Milling at a $\theta_2$ of 20° does not need to be suspended halfway through the pinning layer and may be carried out up to the lower shield as required. The ion incident angle $\theta_2$ in the second stage of milling may be larger or smaller than 20° as required if $\theta_1 < \theta_2$. The incident angle $\theta_1$ desirably satisfies $0° \leq \theta_1 \leq 10°$ to manufacture a reproduction device having a vertical section. The incident angle $\theta_2$ satisfies $10° \leq \theta_2 \leq 30°$ and it is desired that a gentle side face should be manufactured. $\theta_2$ does not need to be maintained at a constant value and may be changed by site and time. By employing this system, a smooth curved interface can be manufactured.

Subsequently, an insulator 210 is grown. In this embodiment, $Al_2O_3$ is deposited by sputtering as the insulator 210 (h). Thereafter, an unnecessary portion deposited on the surface of the device is lifted off together with the resist to remove the insulator 210 positioned above the intermediate layer (i). Since a sense current is applied to the top of the sensor, the top of the sensor film 204 is cleaned as required to ensure conductivity. When conductivity can be fully ensured, cleaning in this step does not need to be carried out. By the steps (h) and (i), the angles $\alpha_1$ (123), $\alpha_2$ (114), $\beta_1$ (116) and $\beta_2$ (115) shown in FIG. 1 are finally determined. $\beta_1$ is mainly determined by $\theta_1$. As the track width is substantially determined by the width of the free layer, $\beta_1$ is preferably close to the disk normal direction. More specifically, when the thickness of the section between the surface of the cap layer 108 and the free layer is represented by $t_1$, the difference between the width of the device on the surface of the cap layer and the width of the free layer is represented by $2t_1 \div \tan \beta_1$. When a reproduction head having a $t_1$ of 25 nm, a $\beta_1$ of 80° and a geometrical track width 118 of 90 nm is taken into consideration, the difference between the width of the device on the surface of the cap layer and the width of the free layer is about 8.8 nm. This is equivalent to almost 10% of the geometrical track width 118 and the tolerance limit of a track width error. That is, $\beta_1$ desirably satisfies $80° \leq \beta_1 \leq 90°$. $\alpha_1$ is desirably almost parallel to $\beta_1$ through the insulator, that is, satisfies $80° \leq \alpha_1 \leq 90°$.

Subsequently, a soft magnet 211 is grown from the top of the sensor (j). In this embodiment, the soft magnet is grown by growing a seed layer by sputtering and plating. However, it can be grown only by sputtering. The grown soft magnet 211 also functions as a side shield, upper shield and upper electrode, thereby completing a side shield type reproduction head. Not shown, after the reproduction head is manufactured, a recording head is formed on the top of the reproduction head.

In this embodiment, the pinned layer 104 is formed in the lower part and the free layer 106 is formed in the upper part of the reproduction head. On the contrary, the free layer 106 may be formed in the lower part and the pinned layer 104 may be formed in the upper part of the reproduction head. In this case, the longitudinal bias layer 107 must be formed under the free layer 106. The section from the uppermost layer to the intermediate layer is etched at an incident angle $\theta_1$ and then the section after the free layer is etched at an incident angle $\theta_2$.

Figure 3:
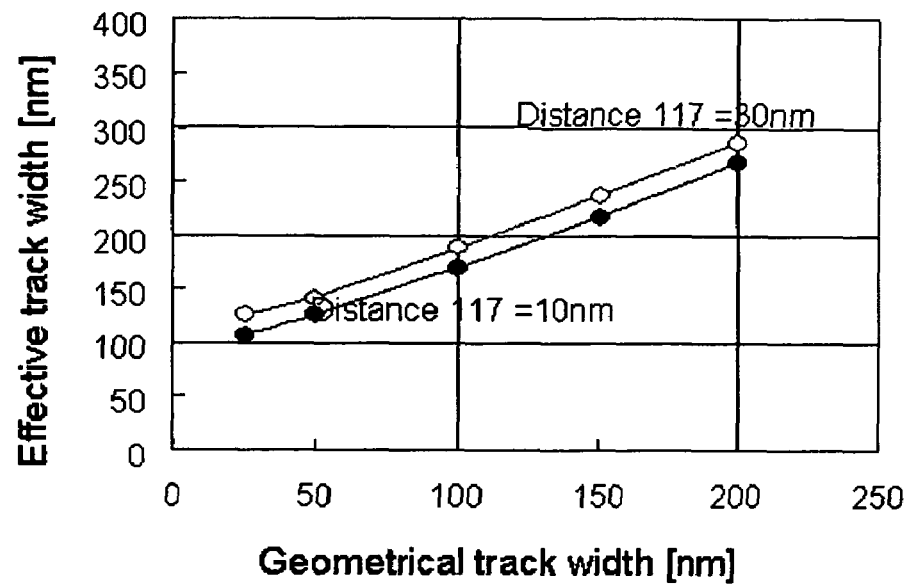
FIG. 3 is a diagram showing the effect of the side shield structure.

The effect obtained when the reproduction head is manufactured as in this embodiment was simulated by a computer. FIG. 3 shows the relationship between the geometrical track width 118 and the effective track width when the distance 117 is changed. In this embodiment, the effective track width is defined as 5% to 95% value width of a reproduction signal curve (so called "micro-track profile") obtained when the head is caused to run over a magnetic track to which a signal has been recorded with a much smaller width than the geometrical track width 118 in the track direction. In FIG. 3, the vertical axis shows the effective track width and the horizontal axis shows the geometrical track width 118. It has been found through the studies that the side shielding effect becomes larger as the distance 117 becomes shorter in all the geometrical track width areas.

Figure 4:
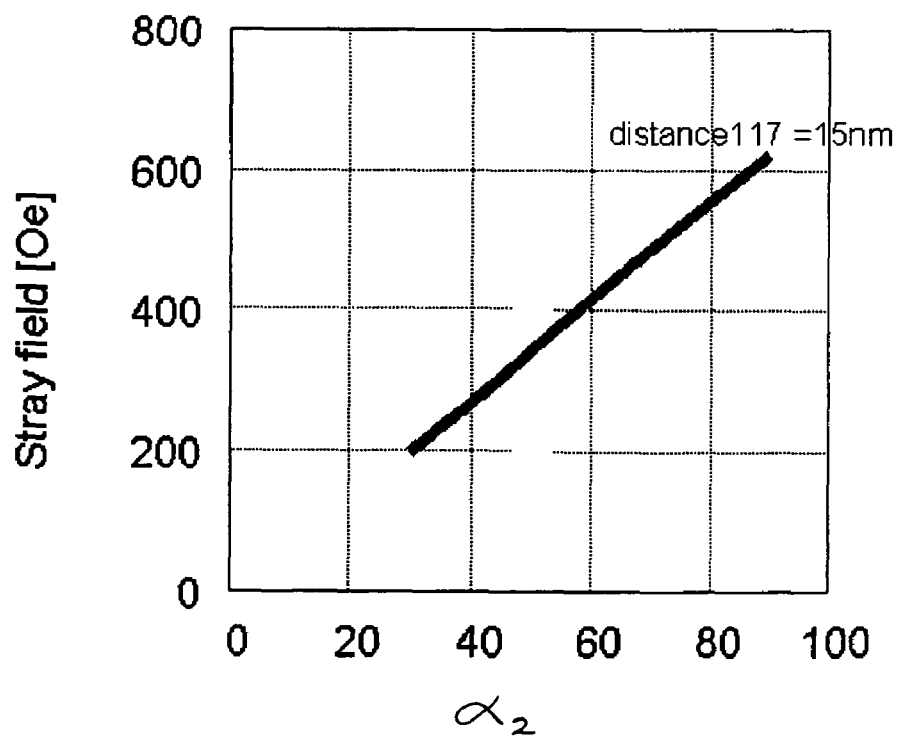
FIG. 4 is a diagram showing the effect of the side shield structure.

Computation for estimating the influence of the side shield angle $\alpha_2$ will be described with reference to FIG. 4. FIG. 4 shows computation results indicating the relationship of $\alpha_2$ and the magnetic field value in the film in-plane direction caused by a side shield generated at the interface between the insulator 110 and the device. The distance 117 was 15 nm. It is understood from the figure that as the angle $\alpha_2$ becomes larger, a leakage magnetic field generated in the end portion of the side shield becomes larger. Since it is considered that a magnetic field generated from the end portion of the side shield exerts an influence upon the magnetization of the free layer and causes a noise, it is desirably small. Therefore, a small angle $\alpha_2$ is considered as desirable. Meanwhile, FIG. 3 shows that the side shield effect is more desired as the distance 117 becomes shorter. FIG. 4 shows that when the distance 117 is 15 nm and the angle $\alpha_2$ is 60°, a magnetic field of about 400 Oe is generated. This value is the maximum allowable value of the practical reproduction head and therefore, the angle $\alpha_2$ should be 60° or less. More specifically, to manufacture the above structure, if possible, the angle $\beta_2$ is desirably small. That is, in the above process, the relationship $\alpha_2 \leq \beta_2 \leq 60°$ is desirably satisfied.

According to the results of these studies, it is understood that the side shield effect becomes larger as the angle $\alpha_2$ becomes smaller and the distance 117 becomes shorter. However, as shown in the known prior art (for example, JP-A 264324/2003), when a side shield is constructed with a single straight line, it is difficult to satisfy these two conditions. As already explained with reference to FIG. 1, this can be solved by changing the angle $\beta_1$ for determining the geometrical track width 118 and the angle $\beta_2$ below the angle $\beta_1$. By using the process which has been explained with reference to FIG. 2, the reproduction head having a structure explained with reference to FIG. 1 can be manufactured efficiently with high yield.

Although JP-A 264324/2003 does not show a specific numerical value, the shape having an angle corresponding to $\beta_2$ and $\alpha_2$ of about 65° is shown in the diagram of the above document. Although the above document discloses 3 nm or more and 60 nm or less as a value corresponding to the distance 117, a further description is not given in the text and diagrams. Therefore, it is not considered that the generation of a magnetic pole caused by the side shield is controlled by the shape of the side shield.

In this embodiment, as shown in FIG. 1, a reproduction head having a distance 117 of 15 nm and an angle $\beta_2$ of 45° is manufactured. Although the side shield effect becomes larger as the distance 117 becomes shorter, when the insulator 110 becomes thin, a problem with dielectric strength occurs. In this embodiment, the shape of the insulator 110 having an angle $\beta_2$ larger than an angle $t_2$ is employed. When this structure is employed, in FIG. 1, the insulator 110 becomes thinnest next to the longitudinal bias layer 107 but a current leak does not occur in this embodiment. When a current leak occurs next to the intermediate layer, it is possible that the reproduction head may not function as a sensor. Therefore, the film thickness and shape of the insulator 110 must be determined to prevent a current leak in this portion. Even when a short circuit occurs, if it occurs only in an area above the intermediate layer 105, a short path is not formed between the upper shield 109 and the lower shield 101, thereby causing no problem.

Figure 5:
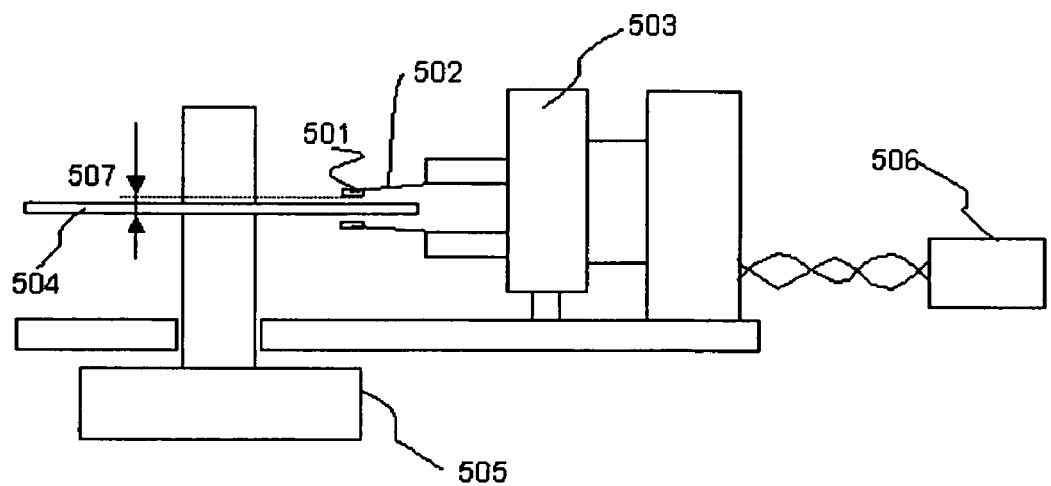
FIG. 5 is a diagram for explaining a hard disk drive having a side shield structure.

By using the reproduction head manufactured as described above, a high-density magnetic recording device can be constructed. A description is subsequently given of a magnetic recording reproduction device with reference to FIG. 5. FIG. 5 is a cross sectional view of a hard disk drive (HDD). A head slider 501 having a recording head and the reproduction head which has been described with reference to FIG. 1 is fixed on a gimbal 502 and electrically connected to a signal processing unit 506. The gimbal can be moved over a recording medium 504 in the radial direction of the recording medium 504 by an actuator 503. The recording medium 504 is fixed to the axis of a spindle 505 and can turn by the rotation of the spindle. In FIG. 5, only one recording medium 504 is shown but two or more recording media may be used. In this embodiment, the medium 504 is composed of a lubricant layer, protective layer, recording layer having in-plane anisotropy and glass substrate. A vertical medium composed of a lubricant layer, protective layer, recording layer having vertical anisotropy and under layer made of a soft magnet may be used in place of the in-plane medium.

The face opposed to the medium of the head slider 501, that is, the air bearing surface is processed by the slider and flotation force is generated by the relative movements of the head slider 501 and the recording medium 504 so that a suitable flying height is obtained. In this embodiment, the slider processing is carried out to obtain a flying height 507 of 7 nm at a recording medium 504 revolution of 7,200 rpm. The flying height is defined as the distance from the uppermost surface of the recording medium including the protective layer and the lubricant layer to the uppermost surface of the head including the protective layer and the lubricant layer. The head slider 501 is formed on the top surface and the under surface of the recording medium and may be formed on only one surface. Wiring from the head slider 501 is connected to the signal processing unit 506 to exchange recording and reproduction signals and tracking information.

A magnetic flux generated from a bit recorded on the recording medium 504 has a larger span as it parts farther from the surface of the medium. Therefore, the above side shield effect is changed by the flying height 507. When the flying height 507 is small, the span of the magnetic flux is not marked with the result that side reading is not large. That is, the side shield effect is not large. When the flying height 507 is reduced too much, the head slider 501 collides with the recording medium 504. On the other hand, when the flying height is large, the spatial span of the magnetic flux becomes large with the result of a small magnetic flux, thereby making it impossible to detect it as a signal. Therefore, there are an upper limit and a lower limit of flying height 507 in order that the side shield effect functions effectively. In the present invention, the inventor has found that when a head having a side shield operates at a flying height 507 of about 1 to 15 nm, desirably, about 2 to 10 nm, the side shield effect becomes marked and effective specially in increasing the recording density. The flying height 507 is set to about 7 nm in this embodiment.

Figure 6:
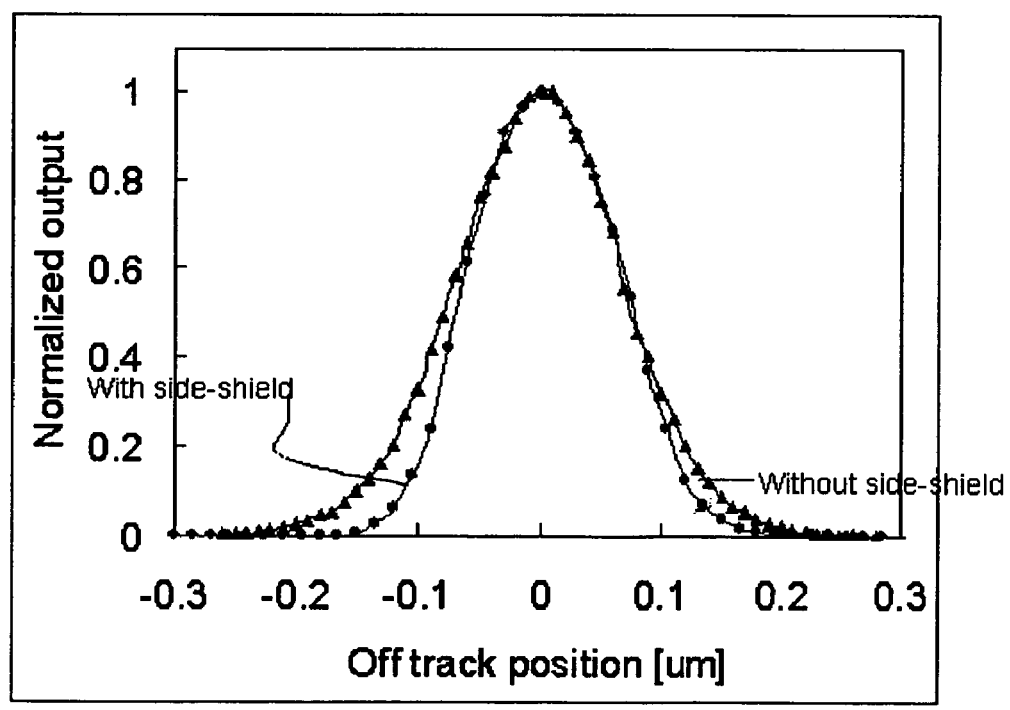
FIG. 6 is a diagram showing the effect of the side shield structure.

The side shield effect was verified by using a magnetic recording device constructed by the above system. FIG. 6 shows examples of micro-track profiles obtained from a reproduction head having a side shield shown in FIG. 1 and a reproduction head having no side shield. Both of the heads have a geometrical track width of 100 nm and the recording media used for measurement are in-plane media essentially composed of CoCrPt. In FIG. 6, the horizontal axis shows the position of the head and the vertical axis shows normalized output. It is understood from FIG. 6 that the reproduction head having a side shield has a narrower micro-track profile than the reproduction head having no side shield. Since the side shield structure manufactured by the process shown in FIG. 2 is employed in this embodiment, a noise caused by the side shield can be made lower and the yield of the head can be made higher than the head employing the side shield reported heretofore in which the angle of the side face of the device is about 65°.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic head comprising:
   a reproduction device including a pinned layer whose magnetization direction is fixed, a free layer whose magnetization direction is changed by an external magnetic field, and a longitudinal bias layer disposed on or under the free layer to stabilize a magnetized structure in the free layer;
   a lower shield disposed under the reproduction device;
   an upper shield disposed on the reproduction device; and
   an insulator for electrically insulating a non-reproducing device portion between the upper shield and the lower shield,
   wherein a soft magnet is formed on an extension line in the film plane direction of the free layer through the insulator, and an angle $\alpha$ formed by the interface between the insulator and the soft magnet and the film plane of the reproduction device is changed to two or more values in a film thickness direction of the reproduction device,
   wherein the angle $\alpha$ at a position close to the lower shield from the free layer is smaller than the angle $\alpha$ at a position close to the upper shield from the free layer, and
   wherein the angle $\alpha$ at a position close to the lower shield from the free layer is 60° or less.

2. The magnetic head according to claim 1, wherein an angle $\beta$ formed by the interface between the end portion in the track width direction of the reproduction device and the insulator and the film plane of the reproduction device is smaller at a position close to the lower shield than the angle $\beta$ at the position of the free layer.

3. The magnetic head according to claim 2, wherein the free layer is disposed above the pinned layer and the angle $\beta$ at the position of the free layer is larger than the angle $\beta$ at the position of the pinned layer.

4. The magnetic head according to claim 3, wherein the angle $\beta$ at the position of the pinned layer is 60° or less, and wherein the angle $\alpha$ at a position close to the lower shield from the free layer is less than or equal to the angle $\beta$ at the position of the pinned layer.

5. The magnetic head according to claim 4, wherein the angle $\beta$ at the position of the pinned layer is about 45°.

6. The magnetic head according to claim 2, wherein the angle $\beta$ at the position of the free layer is substantially 90°.

7. The magnetic head according to claim 1, wherein the angle $\alpha$ at a position close to the upper shield from the free layer is between 80° to 90° inclusive.

8. A magnetic recording system comprising a magnetic head comprising:
   a reproduction device including a pinned layer whose magnetization direction is fixed, a free layer whose magnetization direction is changed by an external magnetic field, and a longitudinal bias layer disposed on or under the free layer to stabilize a magnetized structure in the free layer;
   a lower shield disposed under the reproduction device;
   an upper shield disposed on the reproduction device; and
   an insulator for electrically insulating a non-reproducing device portion between the upper shield and the lower shield,
   wherein a soft magnet is formed on an extension line in the film plane direction of the free layer through the insulator, and an angle $\alpha$ formed by the interface between the insulator and the soft magnet and the film plane of the reproduction device is changed to two or more values in a film thickness direction of the reproduction device,
   wherein the angle $\alpha$ at a position close to the lower shield from the free layer is smaller than the angle $\alpha$ at a position close to the upper shield from the free layer, and
   wherein the angle $\alpha$ at a position close to the lower shield from the free layer is 60° or less.

9. The magnetic recording system according to claim 8, wherein an angle $\beta$ formed by the interface between the end portion in the track width direction of the reproduction device and the insulator and the film plane of the reproduction device is smaller at a position close to the lower shield than the angle $\beta$ at the position of the free layer.

10. The magnetic recording system according to claim 9, wherein the free layer is disposed above the pinned layer and the angle $\beta$ at the position of the free layer is larger than the angle $\beta$ at the position of the pinned layer.

11. The magnetic recording system according to claim 10, wherein the angle $\beta$ at the position of the pinned layer is 60° or less, and wherein the angle $\alpha$ at a position close to the lower shield from the free layer is less than or equal to the angle $\beta$ at the position of the pinned layer.

12. The magnetic recording system according to claim 11, wherein the angle $\beta$ at the position of the pinned layer is about 45°.

13. The magnetic recording system according to claim 9, wherein the angle $\beta$ at the position of the free layer is substantially 90°.

14. The magnetic recording system according to claim 8, wherein the angle $\alpha$ at a position close to the upper shield from the free layer is between 80° to 90° inclusive.

* * * * *